United States Patent [15] 3,668,550
Bullis et al. [45] June 6, 1972

[54] GAS LASER LOW IONIZATION ELECTRIC DISCHARGE

[72] Inventors: Robert H. Bullis, Avon; William Nighan, Manchester, both of Conn.

[73] Assignee: United Aircraft Corporation, East Hartford, Conn.

[22] Filed: Sept. 10, 1969

[21] Appl. No.: 857,648

[52] U.S. Cl. .............................................. 331/94.5, 330/4.3
[51] Int. Cl. ........................................ H01s 3/09, H01s 3/22
[58] Field of Search ................................. 331/94.5; 330/4.3

[56] References Cited

UNITED STATES PATENTS 3,424,997   1/1969   Lopez et al. ........................... 331/94.5
3,464,028   8/1969   Moeller ................................. 331/94.5

OTHER PUBLICATIONS

Clark et al., " The Influence of Xenon on Sealed Off Carbon Dioxide Lasers," IEEE J. Quantum Electronics, Vol. QE-4, No. 5, May 1968, pp. 263– 266
Sobolev et al., " Carbon Dioxide Lasers," Soviet Physics Uspekki, Vol. 10, No. 2, Sept– Oct 1967, pp. 153– 157, 169 & 170
Bletzinger et al., Applied Physics Letters Vol. 12, No. 9, 1 May 1968, pp. 289– 291

Primary Examiner—Ronald L. Wibert
Assistant Examiner—R. J. Webster
Attorney—Melvin Pearson Williams

[57] ABSTRACT

An electric discharge gas laser includes in its gas mixture a small amount of low ionization potential substance proportioned so as to provide a ratio of electric field intensity to neutral gas density within an electric discharge plasma which promotes substantially maximum upper laser level excitation in the lasing gas. Specific embodiments include $CO_2$—$N_2$—He—Cs and $CO_2$—Cs—He, in mixing and pre-mixed configurations.

4 Claims, 6 Drawing Figures

INVENTORS
ROBERT H. BULLIS
WILLIAM NIGHAN
BY Melvin Pearson Williams
ATTORNEY

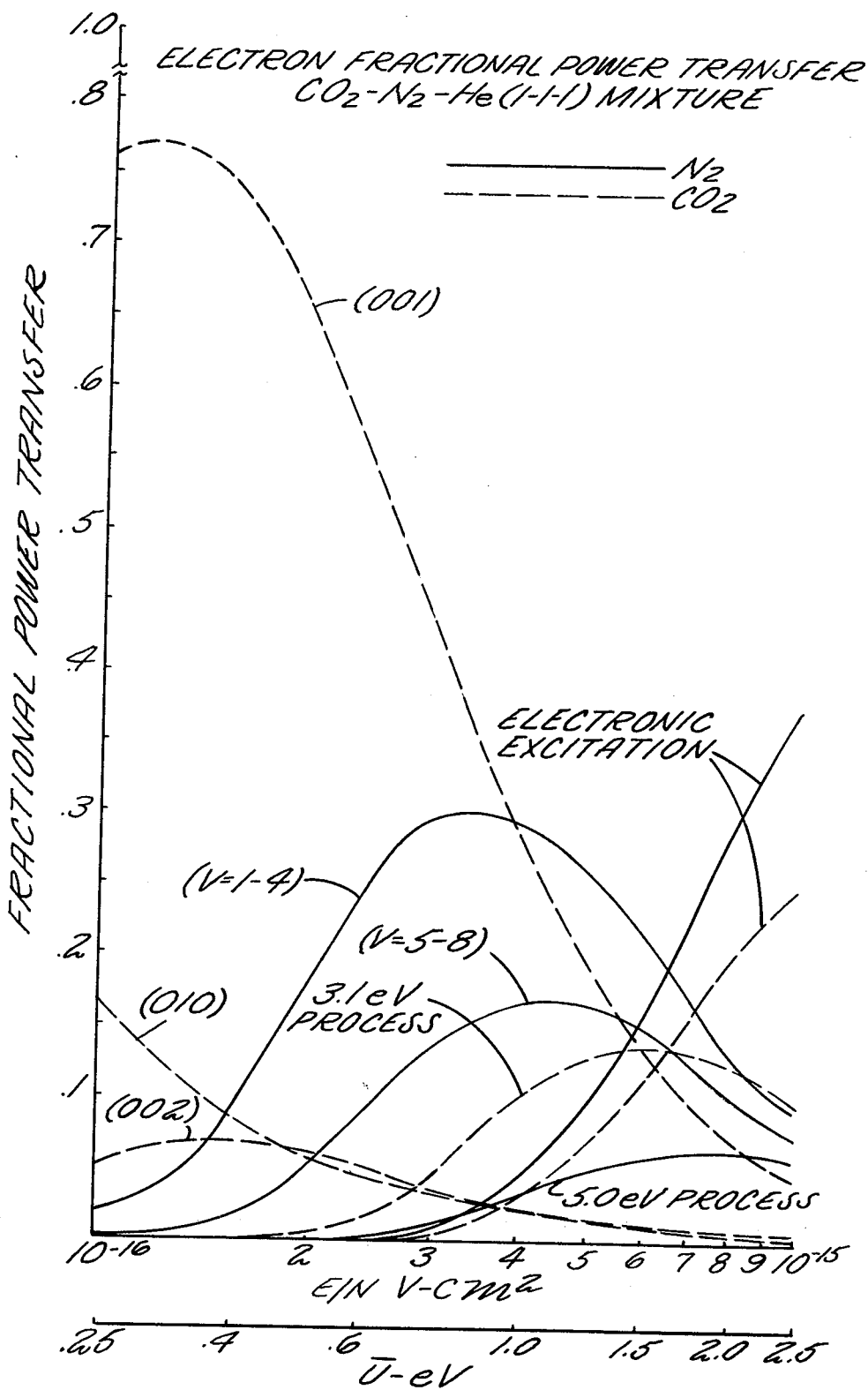

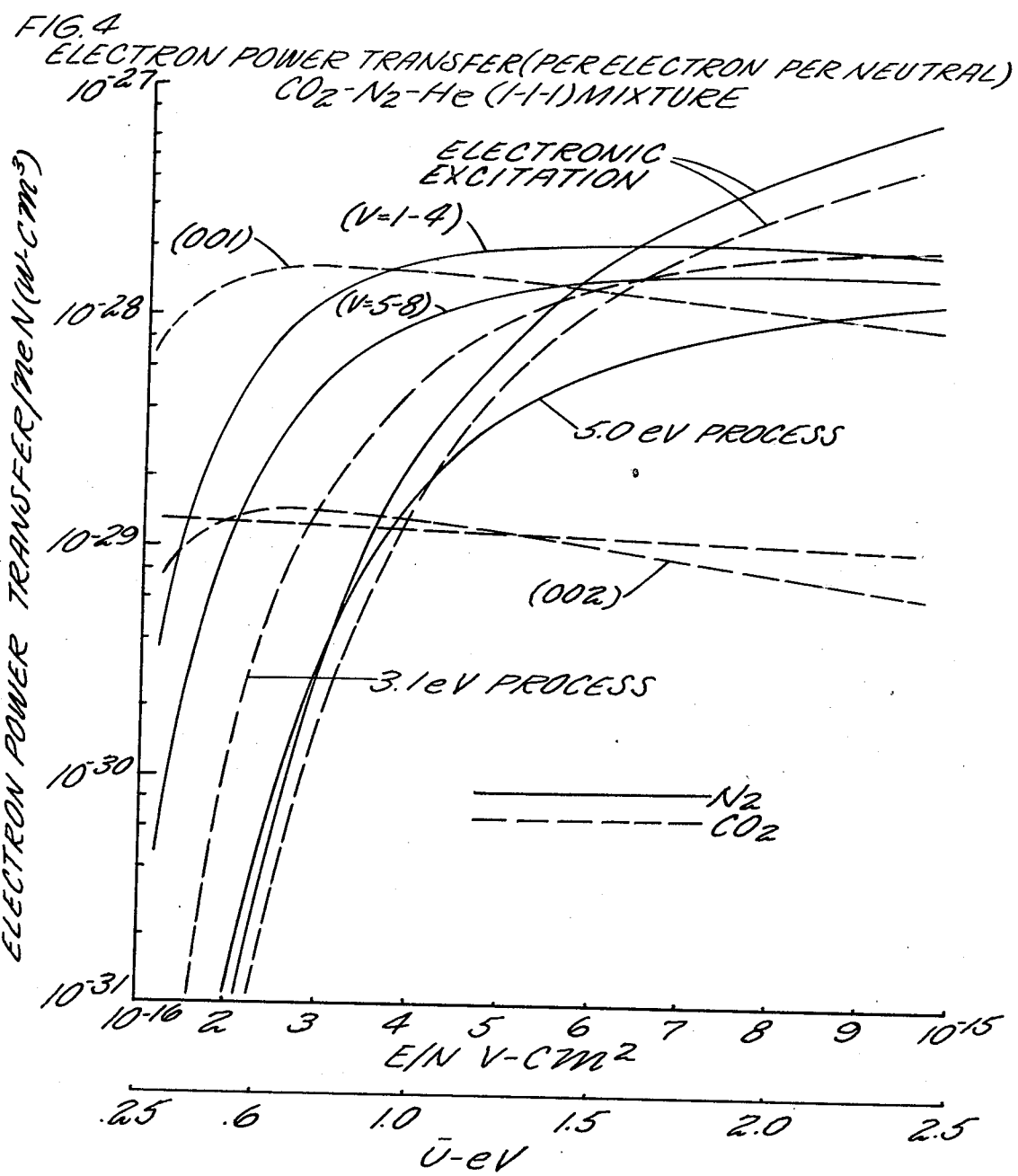

FIG. 5 LASER PERFORMANCE WITH ALKALI METAL SEED
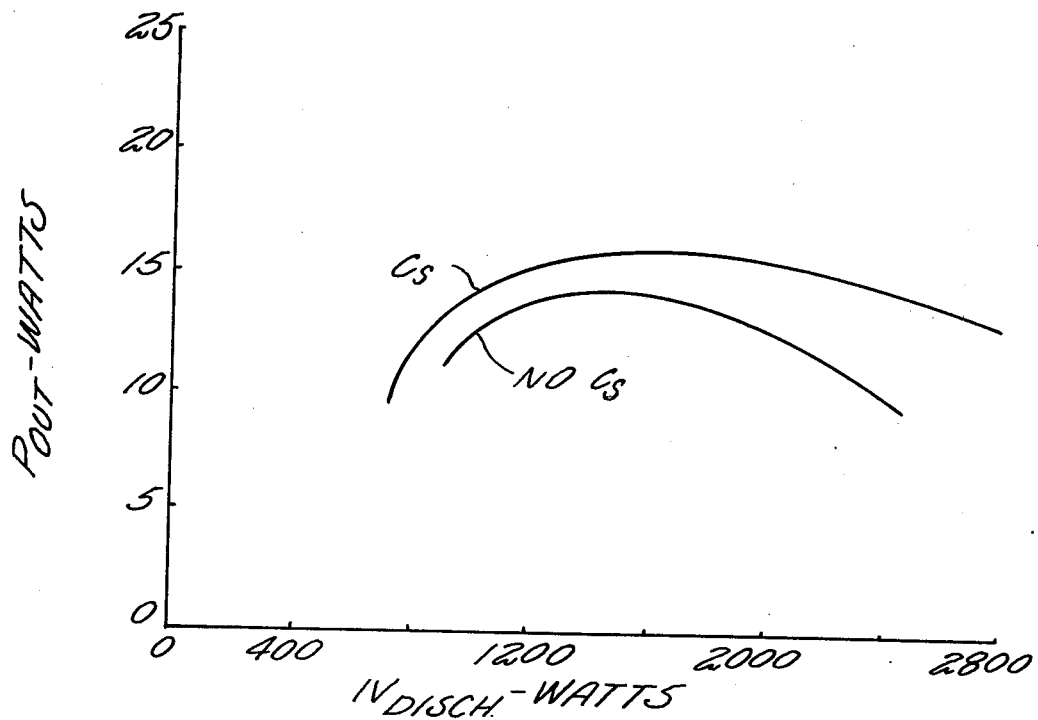
FIG. 6
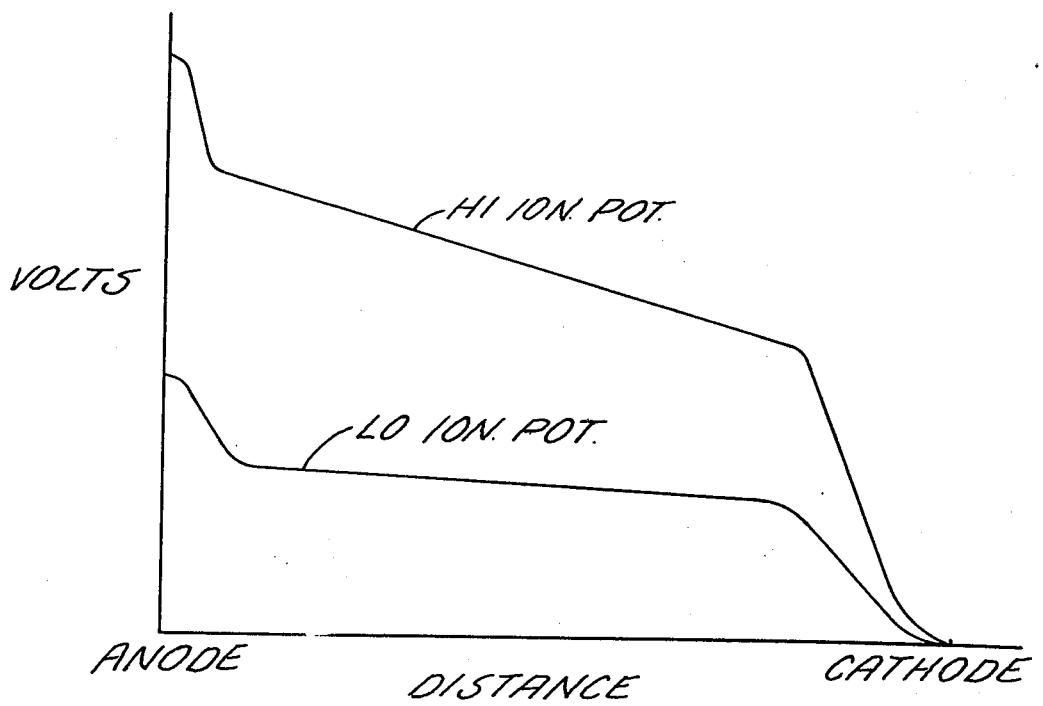

GAS LASER LOW IONIZATION ELECTRIC DISCHARGE

BACKGROUND OF THE INVENTION

1. Field of Invention

This invention relates to electric discharge gas lasers, and more particularly to improvements in the electron collision processes therein.

2. Description of the Prior Art

One of the most attractive lasers known to the prior art is, from a standpoint of power and efficiency, the $CO_2$ electric discharge laser. As is described in more detail in a copending application of the same assignee entitled HIGH PERFORMANCE LASER, Ser. No. 857,649, filed on even date herewith by Brown and Bullis, achieving high optical power operation, including high efficiency, high specific power and high power density, is affected to a great degree by the absolute amount of power which can be coupled into the plasma of an electric discharge. It is known that gas discharge conditions must result in an electron energy distribution that is favorable for upper laser level excitation. The factors influencing the electron energy distribution function are both numerous and complex. Thus, although it is known that a reasonably favorable energy distribution must be achieved, it is not at all obvious in the art how to achieve the desired distribution or even which of the factors influence it the most.

In the operation of gas lasers, one of the limitations on the coupling of power into the gas has been the initiation of localized arcing or streamering, particularly around the metallic electrodes (such as a copper cathode). This is due in part to the high voltage gradients, particularly in the region of the cathode fall and the anode fall. Not only are the metals of the electrode more easily ionized because of the relatively low ionization potential thereof, but the high potential gradients nearby have a tendency to initiate localized arcing in the volume of the gas. Thus, it would appear that having lower voltage gradients within the gas, and particularly near the metallic electrodes, would permit increasing the amount of power which could be coupled into the gases for useful laser output.

SUMMARY OF INVENTION

An object of the present invention is to provide an electric discharge gas laser with enhanced capability for coupling power into optically useful energy levels of the gas;

Another object is to provide an electric discharge gas laser having a more singularly preferential pumping of energy states useful in deriving optical output;

A further object of the present invention is to provide an electric discharge gas laser having a reduced tendency towards streamering of localized arcing.

The present invention is predicated on our discovery of the sensitivity of the electron energy distribution function to particular discharge parameters, and the manner in which the distribution function can be favorably tailored in order to enhance upper laser level excitation. The invention is further predicated on our discovery that altering of the electron energy in a plasma, which is nonetheless maintained by suitable ionization, will in general increase the fractional power transfer into energy levels useful in deriving optical output. Further, we have discovered that a typical gas laser operated with a distribution of lower electron energies, within a range in which fractional energy transfer into energy levels useful for optical output is optimized, does not suffer other penalties. The invention is further predicated on our discovery that the current voltage characteristic of the electric discharge plasma in typical lasers is often highly negative, and that therefore a lowering of the E field does not result in a lower current density. Since the power density is the product of current density and electric field intensity, the power density will not necessarily decline as E is lowered.

According to the present invention, the gas mixture in an electric discharge laser is provided with a seed of a substance having a lower ionization potential than the other gases in the mixture. The amount of low ionization substance is chosen to provide operation of the discharge where the fractional excitation of energy levels useful in obtaining optical output is substantially maximized. The amount of seed utilized is sufficiently small so as to not adversely affect other parameters of the discharge. According further to the present invention, the distribution of electron energy in the electric discharge plasma of a gas laser is shifted toward lower energies by the introduction of particles of an alkali metal in the gas flow. An exemplary seeding material in accordance with the invention is cesium.

The present invention provides optimal excitation of energy states useful in deriving optical output, and increases the maximum power which can be usefully coupled into the gas. The invention further reduces streamering and localized arcing, both in the gas and from the electrodes, as a result of a lowering of the potential gradients throughout the electric discharge region. The present invention permits orders of magnitude increases in the output power capability of any given electric discharge laser configuration capable of delivering the required electrical power.

Other objects, features and advantages of the present invention will become more apparent in the light of the following detailed description of preferred embodiments thereof, as illustrated in the accompanying drawing.

BRIEF DESCRIPTION OF THE DRAWING

FIG. 3 is a chart illustrating fractional power transfer into the gases of a typical gas laser mixture as a function of the E/N ratio;

FIG. 4 is a chart illustrating the power transfer into the gas mixture of the electric discharge plasma of an electric gas laser on a per electron per neutral particle basis as a function of the E/N ratio;

FIG. 5 is a comparative chart illustrating power output as a function of power input for a laser operating both with and without the improvement of the present invention; and FIG. 6 is a chart illustrating qualitatively the potential gradient of a gas mixture having a high ionization potential in contrast with that of a gas mixture having a lower ionization potential.

DESCRIPTION OF THE PREFERRED EMBODIMENT

Figure 1:
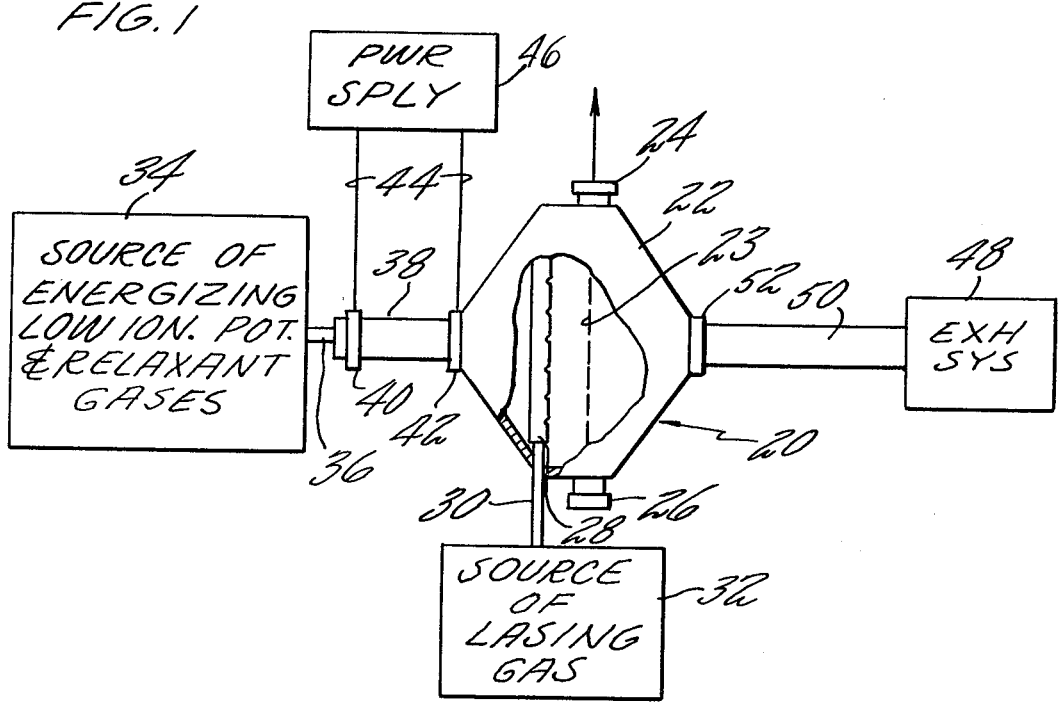
FIGS. 1 and 2 are simplified schematic diagrams of typical configurations in which the present invention may be practiced.
Figure 2:
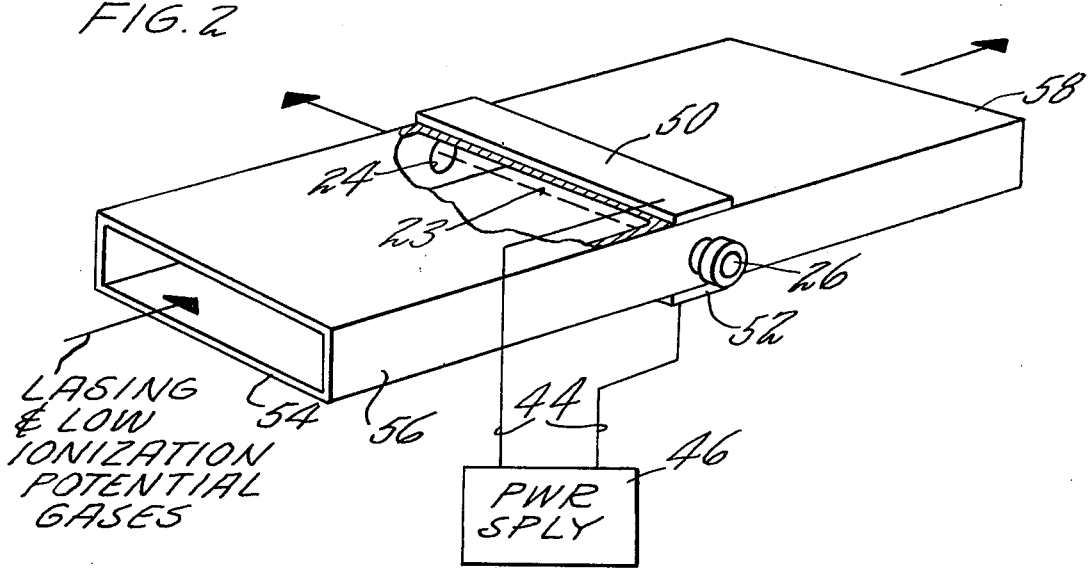

FIGS. 1 and 2 illustrate configurations of gas lasers which may practice the present invention. FIG. 1 is a simple schematic illustration of a flowing gas laser of the mixing type, as disclosed in a copending application of the same assignee entitled GAS LASER, Ser. No. 710,696 filed on Feb. 23, 1968, by Pinsley and Brown. A laser chamber 20 includes a wall structure 22 having an optical gain path 23 which may comprise either an amplifier or an oscillator; if an oscillator, the optical gain path is formed by a pair of mirrors 24, 26; the mirrors may be replaced by windows so as to form a single pass amplifier, or by windows and a series of mirrors so as to form a multi-pass amplifier, as is known in the art. Within the laser chamber 20, a spray bar 28 may inject lasing gas applied thereto over a conduit 30 from a source of lasing gas 32. The laser chamber 20 also receives energizing gas, low ionization potential gas and relaxant gas from a source 34 connected by a conduit 36 to an electric discharge chamber 38. The electric discharge chamber 38 has a pair of electrodes 40, 42; the electrode 42 may also comprise a suitable gas-tight clamp to allow juncture of the electric discharge chamber 38 with the laser chamber 20. The electrodes 40, 42 are connected by wires 44 to a suitable high voltage DC power supply 46. A gas flow may be maintained through the laser chamber 20 in response to an exhaust system 48 connected thereto by a conduit 50 disposed in fluid flow relationship with the chamber 20 by a suitable clamp or other connection means 52. The exhaust system 48 includes a gas pump of suitable volumetric capacity at appropriate pressure, temperature, and velocity. In this configuration, the total flow is comprised of the flow from the sources 32, and 34, but only the flow from the source 34 affects the electric discharge in any fashion important herein.

In another exemplary configuration, shown in FIG. 2, the optical gain path 23 is transverse to the flow of gases, and the optical gain region as such exists only between the mirrors 24, 26 due to the fact that electrodes 50, 52 are aligned transversely with respect to flow and transversely with respect to the optical gain path 23. The gases enter an upstream end 54 of a conduit 56 and exhaust through a downstream end 58 thereof. This embodiment differs from that of FIG. 1 in that the electric discharge and optical gain path are both transverse to the flow and all of the mass flow passes through the electric discharge region.

Referring to FIG. 3, the fractional power transferred into different groups of energy states is plotted as a function of the ratio of the electric field to the number density of neutral or un-ionized particles (E/N ratio), in an electric discharge plasma typical of gas lasers. FIG. 3 relates, as a specific example, to a typical equal parts mixture of $CO_2$, $N_2$ and He. It can be seen that the electronic excitation of molecules in the gas mixture increases substantially for somewhat higher E/N ratios, whereas desirable vibrational excitation ($CO_2$ 001, 002 and $N_2$ $v$=1–8, useful in deriving optical output from the laser) becomes maximum for lower E/N ratios. At even still lower ratios, undesirable vibrational excitation ($CO_2$ 010) predominates. In order to operate a gas laser with a typical mixture of $CO_2$, $N_2$ and He, values of average electron energy, $\bar{u}$, in the 1–2ev range have been found to be optimum since the electronic excitation causes sufficient ionization to maintain the plasma, while the fraction of desirable vibrational excitation of $CO_2$ (001, 002) and $N_2$ ($v$=1 through 8) is sufficient for useful laser operation as is shown in FIG. 3. A typical mixture of $CO_2$, $N_2$ and He may comprise one part of each gas by particle density, this range of average electron energy corresponds to E/N ratios of between $4 \times 10^{-16}$ V-cm$^2$ and $8 \times 10^{-16}$ V-cm$^2$ as is shown in FIG. 3. At higher E/N ratios, (higher $\bar{u}$ values) most of the excitation is electronic and very little desirable excitation results. At lower E/N ratios, (lower $\bar{u}$ values) the desirable vibrational excitation would be optimized, particularly the 001 and 002 levels of $CO_2$, but this cannot be achieved in this gas mixture since there is insufficient electronic excitation to produce the ionization necessary to maintain the plasma at low E/N values. Thus, attempts to optimize the E/N ratio and therefore $\bar{u}$ for maximum desirable vibrational excitation cannot be achieved without failure to sustain the plasma due to lack of sufficient ionization. The information of FIG. 3 is plotted in FIG. 4 in terms of absolute power density transfer into the various molecular levels, on a per electron per neutral particle basis. Therein, it can be seen that approximately $3 \times 10^{-28}$ Watts-cm$^3$ per electron per neutral are provided to desirable vibrational levels at the aforementioned E/N ratios.

The present invention relates to altering the characteristics of a gas flow laser so that sufficient ionization to maintain the plasma can be achieved at E/N ratios that are sufficiently low to enhance the fraction of power transferred into useful laser excitation. Specifically, one embodiment of the present invention provides for inserting into the flow of gases through the region of the electric discharge a small amount of low ionization potential material, such as cesium or other alkali metals. The amount required is quite small, and varies from one case to another. Typically, however, in order to lower the ionization potential of the plasma sufficiently to allow operating with E/N ratios where substantially 60 percent or 70 percent (or more) of the power is transferred into useful vibrational excitation requires fractional concentrations of the Cs in the $10^{-5}$ to $10^{-2}$ range. On the other hand, the amount may be a significant percentage under some operating conditions. Even in such small concentrations, because of its low ionization potential, the Cs lowers the electron energy required to sustain the discharge plasma at a desirable E/N ratio. The resultant low energy electron distribution is then favorably situated for energy transfer to the desirable vibrational levels. For small amounts of low ionization material, the plasma characteristics as presented in FIGS. 3 and 4 hold true, at least sufficiently to illustrate the basic principle of this invention. Thus, addition of small amounts of cesium to a $CO_2$—$N_2$—He mixture, which may for example, comprise equal parts, permits operating in accordance with the data of FIGS. 3 and 4 at a lower E/N ratio (such as 1.5 to $3.0 \times 10^{-16}$ V-cm$^2$) wherein a much more favorable power transfer into useful vibrational levels is achieved. This is illustrated in FIG. 5.

The present invention is illustrated in FIGS. 3 and 4 in terms of the exemplary equal parts $CO_2$—$N_2$—He mixture. However, traces of a low ionization potential material, such as cesium, may be added to other gas mixtures to derive benefit from the present invention. For instance, it is known that a gas laser employing $CO_2$ without $N_2$ operates less favorably than when $N_2$ is present since the average electron energy in the absence of $N_2$ is not favorable for excitation of the $CO_2$ 001 level. However, in accordance with the present invention, traces of a low ionization potential substance such as cesium mixed in with $CO_2$ significantly lowers the electron energy required to sustain the discharge plasma, thereby resulting in an electron energy distribution favorably situated for energy transfer to the $CO_2$ 001 level. Ionization in this discharge is provided by the cesium so that much lower electron energies are achieved, and the rate of upper laser excitation of $CO_2$ is improved greatly.

Furthermore, besides being able to take advantage of the more favorable upper laser level excitation indicated in FIGS. 3 and 4 through the use of low ionization substance it is possible at the same time to enhance the power input to the discharge by the use and control of the seed concentration of the low ionization potential substance.

Another advantage of the present invention is that the low ionization potential material alters the potential gradient of the plasma as illustrated in FIG. 6. It can be seen that the cathode fall and anode fall potentials are significantly lowered, which tends to produce much less electrical stress on the metallic surfaces of the cathode in particular, thus reducing the tendency for metallic ionization or streamering to initiate at the cathode. In addition, having lower potential gradients throughout the plasma, there is less of a tendency for localized arcing to be initiated within the plasma. An alternative way to look at this is that, since the low ionization potential material ionizes at a substantially lower potential than does the metals of the electrodes, the metals are buffered from ionization by the low ionization substance.

Thus, there has been described an improvement in gas lasers employing electric discharge plasmas for the excitation of energy states useful for laser operation. The invention may be practiced in a mixing configuration (FIG. 1) in which an energizing gas, such a nitrogen, is vibrationally excited and the lasing gas, such a carbon dioxide, is introduced downstream thereof in an optical gain region within which the energy is transferred from the energizing gas to a lasing gas. On the other hand, the invention may be practiced in pre-mixed configurations of simple or complex gas mixtures. The present invention may be practiced in conjunction with lasing gas used alone, or lasing gas used with an additional gas useful in promoting upper laser level excitation of the lasing gas. Specifically, the embodiments described herein include both the $CO_2$—$N_2$ laser and the $CO_2$ laser; in either case, the use of relaxant gas does not alter the practice of the present invention.

Although the invention has been shown and described with respect to preferred embodiments thereof, it should be understood by those skilled in the art that the foregoing and various other changes and omissions in the form and detail thereof may be made therein without departing from the spirit and the scope of the invention.

Having thus described typical embodiments of our invention, that which we claim as new and desire to secure by Letters Patent of the United States is:

1. In the operation of laser apparatus having an optical cavity in which optical output power is produced by transitions between vibrational energy states from upper energy levels to lower energy levels in a laser gas having an energy state population inversion and which is provided in said cavity, including the steps of:

exciting the laser gas in an electric discharge plasma region by discharging input electrical energy across the laser gas present in the plasma region to provide the population inversion condition; and providing a source of excited laser gas in the optical cavity; the improvement comprising: admixing with the laser gas in the electric plasma region an alkali metal having an ionization potential substantially lower than does the laser gas to allow operation of the discharge as a plasma with electrons having an average energy which is substantially less than the plasma electrons would have without the admixing whereby the fraction of electrical power which is transferred to the upper vibrational energy levels of the laser gas is substantially increased.

2. The method according to claim 1 wherein the alkali metal is cesium.

3. The method according to claim 1 including the further improvement of providing an additional gas to the electric discharge region to enhance the excitation of the upper vibrational energy states of the laser gas.

4. The method according to claim 3 in which the alkali metal is cesium.

* * * * *